United States Patent
Adler

[15] 3,668,673
[45] June 6, 1972

[54] APPARATUS FOR TELEMETERING D.C. SIGNALS

[72] Inventor: Alan J. Adler, Palo Alto, Calif.
[73] Assignee: Aerotherm Corporation, Palo Alto, Calif.
[22] Filed: Sept. 23, 1970
[21] Appl. No.: 74,641

[52] U.S. Cl. ..................340/208, 340/207 R, 340/177, 332/30 V, 331/66, 325/145
[51] Int. Cl. .........................................G08c 19/16
[58] Field of Search ..............340/207, 208, 177; 325/145; 331/66, 117; 307/240; 332/30 V, 29

[56] References Cited

UNITED STATES PATENTS

| | | | |
|---|---|---|---|
| 3,387,296 | 6/1968 | Epstein et al. | 307/240 |
| 3,393,379 | 7/1968 | Sanford | 332/29 |
| 3,214,708 | 10/1965 | Chamberlain | 340/208 |
| 3,400,338 | 9/1968 | Ishman | 332/30 V |
| 3,332,035 | 7/1967 | Kovalevski | 332/30 V |

OTHER PUBLICATIONS

Airpax Electronics Bulletin C-126, June 30, 1967.
Airpax Electronics Bulletin C-125, Apr. 10, 1967.

*Primary Examiner*—John W. Caldwell
*Assistant Examiner*—Robert J. Mooney
*Attorney*—Flehr, Hohbach, Test, Albritton & Herbert

[57] ABSTRACT

A telemetry transmitter where a d.c. voltage from for example a strain gage which is to be telemetered is converted to an a.c. square wave by a chopper. This amplitude modulated signal drives a voltage controlled oscillator which produces a frequency modulated signal which is then transmitted to a receiver by an antenna or wire.

5 Claims, 3 Drawing Figures

PATENTED JUN 6 1972   3,668,673
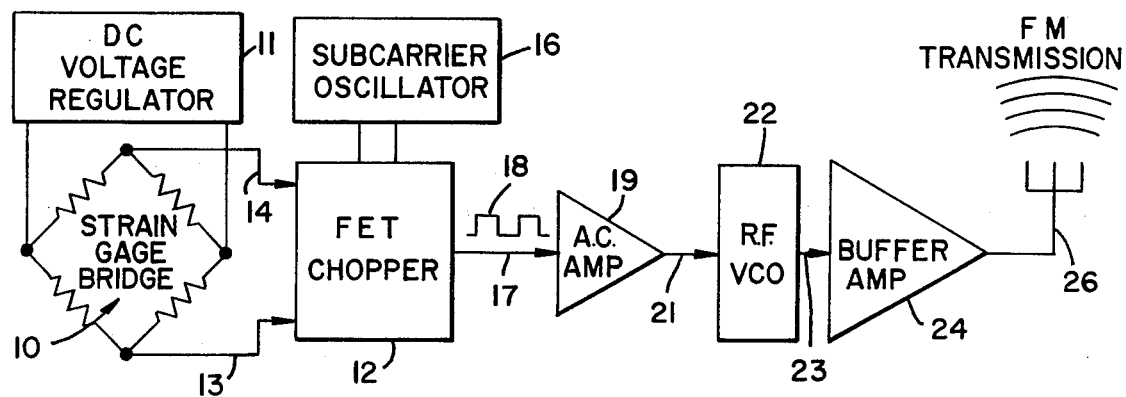
FIG_1
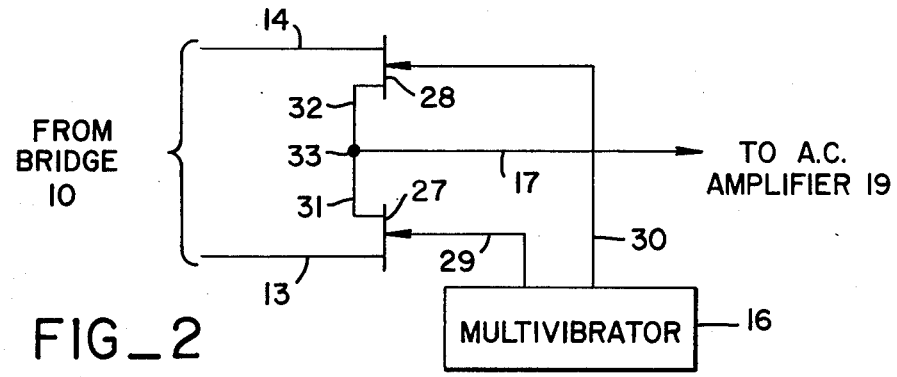
FIG_2
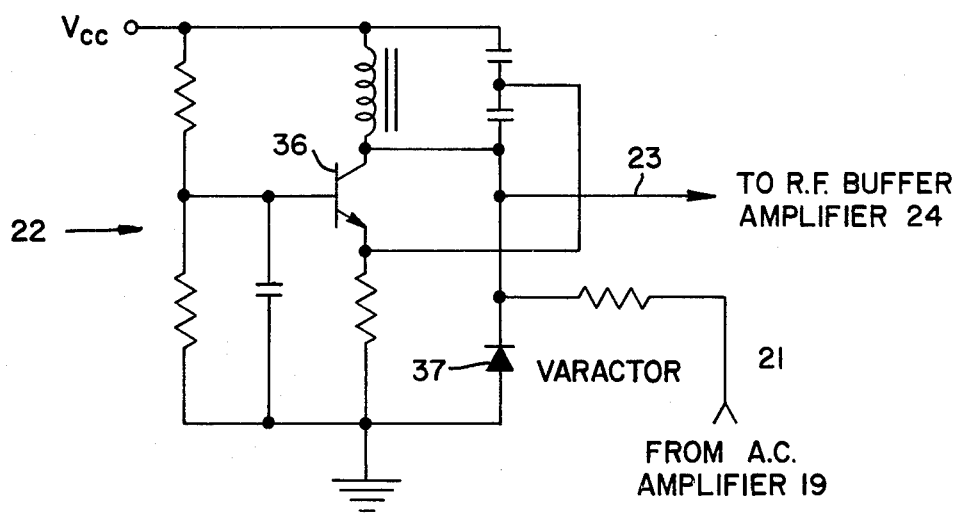
FIG_3
INVENTOR.
ALAN J. ADLER
BY
Flehr, Hohbach, Test,
Albritton & Herbert
ATTORNEYS

APPARATUS FOR TELEMETERING D.C. SIGNALS

BACKGROUND OF THE INVENTION

The present invention is directed to apparatus for telemetering d.c. signals and more particularly to a transmitter responsive to variations in measuring devices such as strain gages and thermocouples for transmitting a modulated information signal.

Telemetry transmitters where the input data frequency extends down to d.c. has always posed a problem to telemetry designers. The major reason is that the output levels of for example a strain gage bridge are often small compared to the amount of d.c. drift of the telemetry electronics.

A typical example of a standard approach to a d.c. or static strain telemetry is what is termed an FM/FM system. Here the output of for example a strain gage is amplified by a d.c. amplifier which drives a sub-carrier voltage controlled oscillator (VCO). The output of this VCO then drives a radio frequency transmitting VCO; thus the FM/FM system. This technique, although widely used, suffers greatly from temperature induced zero shift. The principal source of this zero shift comes from the d.c. amplifier. In addition the drift of the sub-carrier VCO may be a serious problem.

Another problem produced by the use of the d.c. amplifier is a requirement of a relatively high voltage supply, battery life of a self-contained transmitting unit is concomitantly reduced. In addition the d.c. amplifier requires more complex circuitry.

OBJECTS AND SUMMARY OF THE INVENTION

It is therefore a general object of the present invention to provide an improved apparatus for telemetering d.c. signals.

It is another object of the invention to provide apparatus as above which is temperature stable and has circuitry which is considerably simplified thus permitting a reduction in size, weight and battery drain.

It is another object of the invention to provide apparatus as above which has improved noise rejection.

In accordance with the foregoing objects there is provided apparatus for telemetering d.c. signals including a transmitter coupled to a d.c. signal source. The transmitter comprises sub-carrier oscillator means and amplitude modulation means responsive to the d.c. signal and the sub-carrier oscillator means to produce an amplitude modulated output signal. This signal includes a sub-carrier signal from the sub-carrier oscillator means and a modulation signal which is the d.c. signal. Voltage controlled oscillator means are responsive to the amplitude modulated output signal for generating a frequency modulated output signal whose frequency deviation is proportional to the modulation signal. Means are coupled to the voltage controlled oscillator means for transmitting the frequency modulated output signal.

BRIEF DESCRIPTION OF DRAWING

FIG. 1 is a block diagram embodying the present invention.
FIG. 2 is a detailed schematic of a portion of FIG. 1.
FIG. 3 is a detailed circuit diagram of another portion of FIG. 1.

DETAILED DESCRIPTION OF PREFERRED EMBODIMENT

Referring to FIG. 1 a strain gage bridge 10 is excited by the output of a d.c. voltage regulator 11. For a strain gage the voltage regulator may for example provide a voltage of 2 volts. The output of bridge 10 is coupled to a field effect transistor chopper 12 by lines 13 and 14. The chopper acts as an amplitude modulator and the output of the strain gage bridge 10 amplitude modulates sub-carrier oscillator 16. Oscillator 16 is actually a multivibrator as illustrated in FIG. 2.

Strain gage 10, of course, is merely a typical example of a static signal source; another typical source is a thermocouple. It should also be emphasized that although the output signal of the source 10 on lines 13 and 14 has been characterized as d.c. such d.c. signal may have a variation of several hundred or thousand Hertz. The sub-carrier oscillator frequency is therefore partially determined by the maximum frequency from the strain gage bridge to be measured. For example it has been found that if the maximum measurable strain frequency is to extend from d.c. to 2 KHz that the frequency of the sub-carrier oscillator should preferably be 4 KHz.

The output of chopper 12 on output line 17 is an amplitude modulated signal 18 which is in the form of a square wave with an amplitude which is exactly equal to the d.c. signal from the strain gage bridge. An a.c. amplifier 19 amplifies the output of chopper 12 and has its output 21 coupled to a radio frequency voltage controlled oscillator (VCO) 22 for generating a frequency modulated output signal on output line 23 whose frequency deviation is proportional to the d.c. signal from the strain gage bridge 10. This is also the amplitude of the amplitude modulated signal 18.

Finally a buffer amplifier 24 couples the frequency modulated signal on line 23 to an antenna 26 which propagates or transmits the FM signal to a receiver which demodulates the FM modulation information to provide the original d.c. level which was present at the lines 13 and 14 of the strain gage bridge 10.

Alternatively, of course the signal may be transmitted to the receiver by wire. This is especially the case when VCO 22 is operating at an audio frequency. A typical value would be 2.5 KHz with oscillator 16 providing a 250 Hz signal which would allow the d.c. signal to vary up to 125 Hz.

Details of the chopper 12 are shown in FIG. 2. The gate inputs of field effect transistors 27 and 28 are respectively coupled to the complimentary outputs 29 and 30 of multivibrator 16. Output terminal 31 of field effect transistor 27 and terminal 32 of field effect transistor 28 are coupled together at 33 which is coupled to the output line 17 which extends to a.c. amplifier 19. The multivibrator chopper 12 automatically produces the square wave output 18 which has a modulation of 100 percent. This is especially desirable for small signals in the microvolt range.

Other types of amplitude modulators of a more standard type may be used in the present invention.

FIG. 3 shows a detailed schematic of radio frequency VCO 22. It consists essentially of a transistor 36 connected as a Colpitts type oscillator with a varactor 37 determining the frequency of oscillation. Coupled to one terminal the varactor is output line 21 from a.c. amplifier 19. Thus variation of the amplitude of the amplitude modulated signal 18 changes the capacitance of varactor 37 in a manner well known in the art to provide a frequency modulated signal on output line 23 which is connected to the collector of transistor 36.

In operation it is apparent that by the inherent nature of the system of the present invention that any drift of the center frequency of VCO 22 is of no interest. This is because the telemetry data is entirely expressed by the magnitude of the dynamic deviation. The VCO input deviation sensitivity is ordinarily 10 times more stable than its center frequency.

In addition it is apparent that there is no d.c. type amplifier in the circuit and thus attendant drift problems associated with these amplifiers have been eliminated. Lastly the method of the present invention, which may be described as a AM/FM method since it involves amplitude modulation and thereafter frequency modulation, offers better noise rejection than the typical FM/FM system discussed above. The equation for the comparative noise rejection of AM and FM is $$\frac{S/N_{FM}}{S/N_{AM}} = \sqrt{3} \cdot M \qquad (1)$$

where
$S/N_{FM}$ = FM signal to noise ratio
$S/N_{AM}$ = AM signal to noise ratio
$M$ = modulation index M = deviation/deviating frequency The foregoing equation is valid for comparison of AM/FM versus FM/FM systems since in both systems the main carrier frequency which is propagated by the antenna is FM modulated and the difference between the two systems is the method of sub-carrier modulation.

A typical FM/FM telemetry transmitter has a sub-carrier modulation index of:

$$M = 400/1{,}200 = 0.33 \qquad (2).$$

where

400 = 10 percent deviation of a 4KHz subcarrier 1,200 = deviating frequency = strain bandwidth Substituting M in Eq. (1), we have:

$$\frac{S/N_{FM}}{S/N_{AM}} = \sqrt{3} \cdot 0.33 \qquad (3)$$

$$= 0.57$$

Thus it is apparent that under normal operating conditions the noise rejection of an FM/FM system is considerably improved by the AM/FM system of the present invention. In addition battery drain is lower because no d.c. amplifier is necessary. Temperature drifts are reduced since the center frequency of the single VCO is not critical. Without the need to compensate or provide for extensive temperature stabilization circuitry is considerably simplified permitting reduction in size, weight and battery drain.

What is claimed is:

1. Apparatus for telemetering d.c. signals including a transmitter coupled to a d.c. signal source said transmitter comprising: sub-carrier oscillator means; amplitude modulation means responsive to said d.c. signal and said sub-carrier oscillator means to produce an amplitude modulated output signal comprising a sub-carrier signal from said sub-carrier oscillator means and a modulation signal which is said d.c. signal; voltage controlled oscillator means directly responsive to said amplitude modulated output signal for generating a frequency modulated output signal whose amount of frequency deviation is proportional to said modulation signal and whose rate of deviation is equal to the frequency of said sub-carrier signal; and means coupled to said voltage controlled oscillator means for transmitting said frequency modulated output signal.

2. Apparatus as in claim 1 where said amplitude modulation means provides 100 percent modulation of said sub-carrier signal.

3. Apparatus as in claim 1 where said amplitude modulation means chops said d.c. signal at the frequency of said sub-carrier signal.

4. Apparatus as in claim 3 where said sub-carrier oscillator is of the multivibrator type.

5. Apparatus as in claim 4 where said amplitude modulator means includes a pair of series connected field effect transistor having their gate terminals coupled to complementary outputs of the multivibrator oscillator and with two of their output terminals coupled to said d.c. signal source.

* * * * *